(12) United States Patent
Nammoto et al.

(10) Patent No.: US 9,102,059 B2
(45) Date of Patent: Aug. 11, 2015

(54) ROBOT CONTROL METHOD, ROBOT CONTROL DEVICE, ROBOT, AND ROBOT SYSTEM

(71) Applicant: Seiko Epson Corporation, Tokyo (JP)

(72) Inventors: Takashi Nammoto, Sendai (JP); Kazuhiro Kosuge, Sendai (JP); Kengo Yamaguchi, Sendai (JP); Yasuhisa Hirata, Sendai (JP)

(73) Assignee: Seiko Epson Corporation (JP)

( * ) Notice: Subject to any disclaimer, the term of this patent is extended or adjusted under 35 U.S.C. 154(b) by 1 day.

(21) Appl. No.: 14/161,990

(22) Filed: Jan. 23, 2014

(65) Prior Publication Data

US 2014/0214202 A1    Jul. 31, 2014

(30) Foreign Application Priority Data

Jan. 30, 2013    (JP) ................. 2013-015992

(51) Int. Cl.
*B25J 9/16*    (2006.01)
*B25J 15/06*    (2006.01)

(52) U.S. Cl.
CPC .............. *B25J 9/1653* (2013.01); *B25J 15/06* (2013.01); *G05B 2219/39478* (2013.01); *G05B 2219/39505* (2013.01); *G05B 2219/39514* (2013.01); *G05B 2219/39536* (2013.01); *G05B 2219/39542* (2013.01)

(58) Field of Classification Search
CPC ............... B25J 9/1653; B25J 15/06–15/0691; G05B 2219/39001; G05B 2219/39536; G05B 2219/39542; G05B 2219/39547; G05B 2219/39523; G05B 2219/39514; G05B 2219/39507; G05B 2219/39505; G05B 2219/39476; G05B 2219/37478; B23P 19/006; B23P 19/007
See application file for complete search history.

(56) References Cited

FOREIGN PATENT DOCUMENTS

| JP | 60-025686 | 2/1985 |
|---|---|---|
| JP | 61-182786 | 8/1986 |
| JP | 2003-094367 A | 4/2003 |
| JP | 2005-007486 A | 1/2005 |
| JP | 2006-026875 A | 2/2006 |
| JP | 2010-069542 A | 4/2010 |

*Primary Examiner* — Khoi Tran
*Assistant Examiner* — Adam Mott
(74) *Attorney, Agent, or Firm* — Harness, Dickey & Pierce, P.L.C.

(57) ABSTRACT

A robot control method includes a first step of selecting a holding form in which a robot holds an object and a second step of determining whether the object can continue to be stably held when a predetermined external force is applied to the object in the selected holding form. In the second step, it is determined that the object can continue to be stably held when a force which should be generated by a contact portion to generate resistance to the predetermined external force is included in a friction cone of a force generated by driving the contact portion and enlarged by a suction force from the suction mechanism.

6 Claims, 11 Drawing Sheets

ROBOT CONTROL METHOD, ROBOT CONTROL DEVICE, ROBOT, AND ROBOT SYSTEM

BACKGROUND

1. Technical Field

The present invention relates to a robot control method, a robot control device, a robot, and a robot system.

2. Related Art

In recent years, the following has been known as a method of controlling a suction type robot (see JP-A-2010-69542). A robot hand is first made to move forward to a workpiece holding target position and a holding state is checked. When the holding state is not good, the workpiece holding target position is changed and the robot hand is made to move forward up to the holding state. When the holding state is good, the robot hand is made to move backward so as to take out a workpiece and the holding state is checked again. When the holding state is not good, the workpiece holding target position is changed and the robot hand is made to move again to the changed workpiece holding target position.

However, in the above-mentioned control method, the holding state when a workpiece has been held is checked, but when an external force is applied such as when the workpiece collides with something during work, when an inertial force is applied to the workpiece due to acceleration or deceleration, when the weight of the workpiece increases by attaching another component thereto, or when the workpiece is pressed against another component to attach the component thereto, there is a problem in that slipping occurs on the contact surface of the robot hand and the workpiece and thus the workpiece does not continued to be stably held, such that the holding is not continued or the holding position is changed.

SUMMARY

An advantage of some aspects of the invention is to provide a robot control method, a robot control device, a robot, and a robot system which can determine a holding form in which an object can continue to be stably held even when a predetermined external force is applied to a robot having a suction mechanism due to the above-mentioned collision, inertial force, increase in weight, or pressing against another object.

(1) An aspect of the invention is directed to a robot control method of a robot that has a suction mechanism for at least one contact portion coming in contact with an object to hold the object and that holds the object, the robot control method including: selecting a holding form in which at least a position on the object coming in contact with the at least one contact portion is at least specified as a holding form in which the robot holds the object; and determining whether the object can continue to be stably held when a predetermined external force is applied to the object in the selected holding form, wherein it is determined that the object can continue to be stably held when a force which should be generated by the at least one contact portion to generate resistance to the predetermined external force is included in a friction cone formed by a friction coefficient and a suction force from the suction mechanism.

According to this configuration, a non-slip condition based on friction including a suction force from the suction mechanism can be applied. Therefore, it is possible to determine in advance a holding form in which a robot having a suction mechanism can continue to stably hold an object even when a predetermined external force assumed in advance is applied to the object.

(2) Another aspect of the invention is directed to the robot control method according to the aspect described above, wherein the suction force of the suction mechanism may be set to a value based on an angle formed by a contact surface of the object coming in contact with the suction mechanism and the suction mechanism.

According to this configuration, the suction force of the suction mechanism is set to a value based on the angle formed by the contact surface of the object and the suction mechanism. Accordingly, even when the suction force greatly varies depending on the angle formed by the contact surface of the object and the suction mechanism, it is possible to appropriately determine a holding form in which an object can continue to be stably held.

(3) Still another aspect of the invention is directed to the robot control method according to the aspect described above, wherein the method further includes selecting a holding form in which the predetermined friction coefficient is the minimum out of the holding forms in which it is determined that the object can continue to be stably held when the selecting of a holding form and the determining of whether the object can continue to be stably held are performed with a predetermined friction coefficient set to a value in a predetermined range.

According to this configuration, since a holding form which is established even with the smallest friction coefficient can be selected out of the holding forms in which the object can continue to be stably held, it is possible to select a holding form in which an object can continue to be stably held even when the friction coefficient is reduced due to aging degradation of the robot.

(4) Yet another aspect of the invention is directed to a robot control method of a robot that has a suction mechanism for at least one contact portion coming in contact with an object to hold the object and that holds the object, wherein the robot is controlled so that a normal line of a suction surface in nonuse of the suction mechanism is perpendicular to a contact surface of the object coming in contact with the at least one contact portion at the time of holding the object.

According to this configuration, since the normal line of the suction surface in nonuse of the suction mechanism is perpendicular to the contact surface of the object coming in contact with the contact portion, it is possible to control the robot so as to continue to stably hold an object efficiently using the suction force of the suction mechanism.

(5) Still yet another aspect of the invention is directed to a robot control device controlling a robot that has a suction mechanism for at least one contact portion coming in contact with an object to hold the object and that holds the object, the robot control device including: a holding form determining unit that determines in advance a holding form in which at least a position on the object coming in contact with the at least one contact portion is specified as the holding form in which the object can continue to be stably held even when a predetermined external force is applied to the object; and a robot control signal generating unit that generates a signal for controlling the robot so that the robot holds the object in the determined holding form, wherein the holding form determining unit determines that the object can continue to be stably held even when the predetermined external force is applied to the object, when a force which should be generated by the at least one contact portion to generate resistance to the predetermined external force is included in a friction cone formed by a friction coefficient and a suction force from the suction mechanism.

According to this configuration, it is possible to obtain the same operational advantages as in the robot control method according to the above-mentioned aspect.

(6) Further another aspect of the invention is directed to a robot that has a suction mechanism for at least one contact portion coming in contact with an object to hold the object and that holds the object, the robot including: a holding form determining unit that determines in advance a holding form in which at least a position on the object coming in contact with the at least one contact portion is specified as the holding form in which the object can continue to be stably held even when a predetermined external force is applied to the object; and a robot control signal generating unit that generates a signal for controlling the robot so that the robot holds the object in the determined holding form, wherein the holding form determining unit determines that the object can continue to be stably held even when the predetermined external force is applied to the object, when a force which should be generated by the at least one contact portion to generate resistance to the predetermined external force is included in a friction cone formed by a friction coefficient and a suction force from the suction mechanism.

According to this configuration, it is possible to obtain the same operational advantages as in the robot control method according to the above-mentioned aspect.

(7) Still further another aspect of the invention is directed to a robot system including: a robot that has a suction mechanism for at least one contact portion coming in contact with an object to hold the object and that holds the object; and a control device that controls the robot, wherein the control device includes a holding form determining unit that determines a holding form in which at least a position on the object coming in contact with the at least one contact portion is specified in advance as the holding form in which the object can continue to be stably held even when a predetermined external force is applied to the object, and a robot control signal generating unit that generates a signal for controlling the robot so that the robot holds the object in the determined holding form, and wherein the holding form determining unit determines that the object can continue to be stably held even when the predetermined external force is applied to the object, when a force which should be generated by the at least one contact portion to generate resistance to the predetermined external force is included in a friction cone formed by a friction coefficient and a suction force from the suction mechanism.

According to this configuration, it is possible to obtain the same operational advantages as in the robot control method according to the above-mentioned aspect.

According to the aspects of the invention, it is possible to determine in advance a holding form in which a robot having a suction mechanism can continue to stably hold an object even when a predetermined external force assumed in advance is applied to the object.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
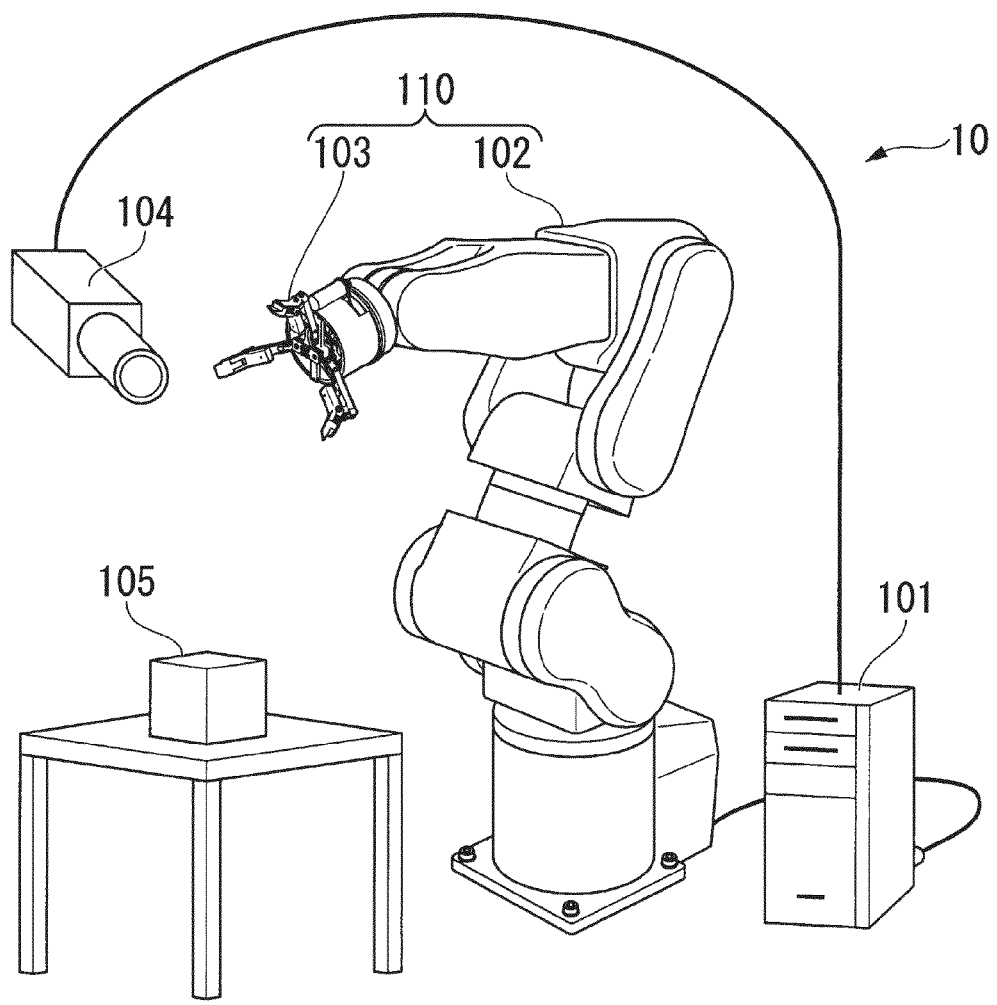
FIG. 1 is an outside view illustrating a configuration of a robot system according to a first embodiment of the invention.

FIG. 1 is an outside view illustrating a configuration of a robot system 10 according to this embodiment. The robot system 10 according to this embodiment includes a robot 110, a control device 101, and a camera 104. The robot 110 includes a manipulator 102 and a robot hand 103. An object 105 is an example of a workpiece in the robot system. The robot 110 holds the object 105 to perform work.

The robot hand 103 is mounted on a tip of the manipulator 102 and has plural fingers for holding the object 105. One end of the manipulator 102 is fixed to a pedestal or the like and the robot hand 103 is mounted on the other end thereof. The manipulator 102 causes the robot hand 103 to move to a position and a posture for holding the object 105 by causing joints to move. The camera 104 captures an image of the object 105 and inputs an image signal as the imaging result to the control device 101. The camera 104 captures an image of the object 105 from plural viewpoints and inputs the image signals to the control device 101 so that the control device 101 can calculate the shape of the object 105. In order to capture an image from the plural viewpoints, the camera 104 may be made to move or plural cameras may be provided. The control device 101 calculates a posture with which the robot hand 103 can stably hold the object 105 with reference to the image signals received from the camera 104, and controls the robot 110 so that the robot hand 103 holds the object 105 with the calculated posture. In the following embodiments, if it is mentioned that the object 105 can be stably held, it means that no slip occurs at contact points between the robot hand 103 and the object 105 when a predetermined external force assumed in advance is applied to the object 105 in a state where the robot hand 103 holds the object 105.

Figure 2:
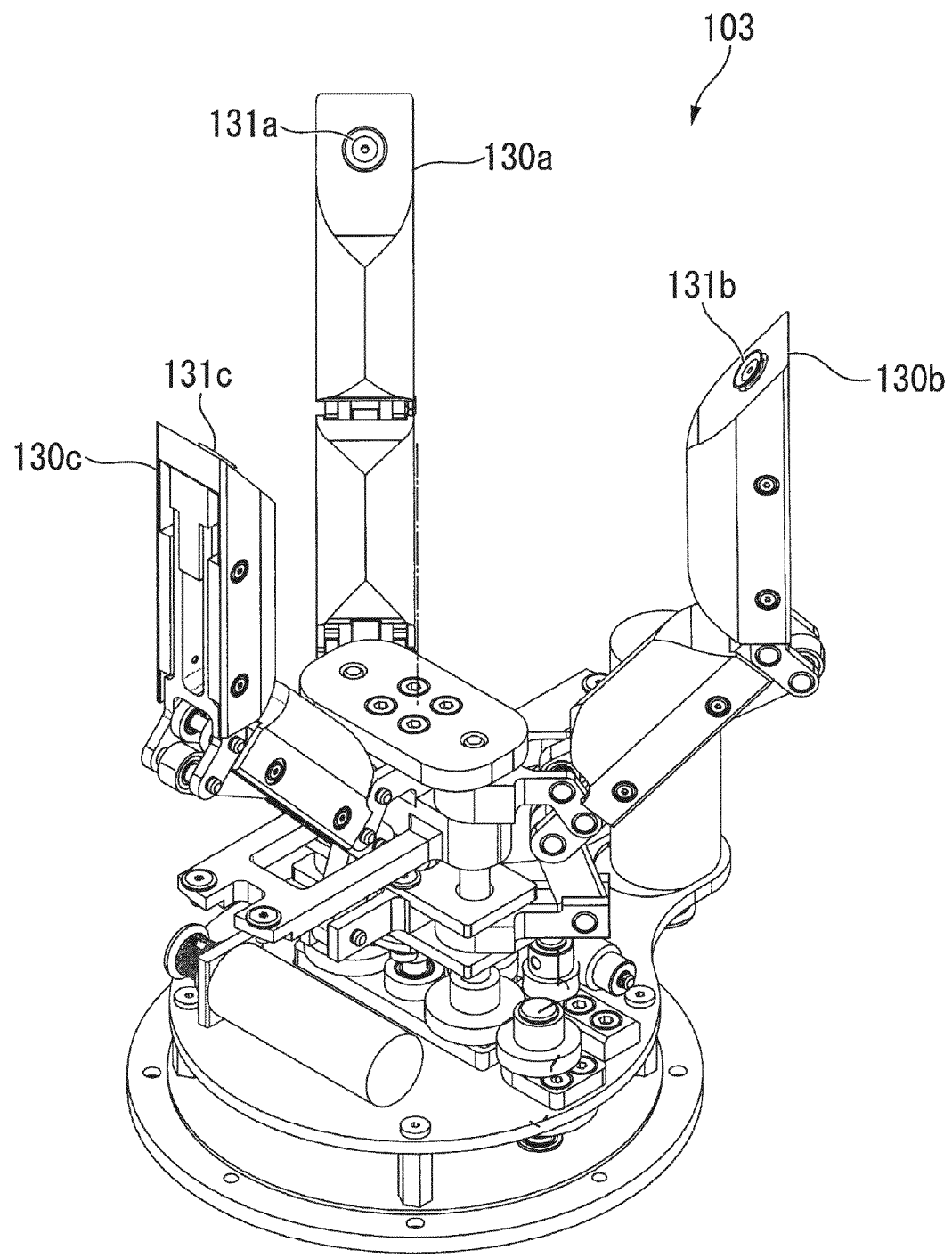
FIG. 2 is an outside view illustrating a configuration of a robot hand according to the first embodiment of the invention.

FIG. 2 is an outside view illustrating the configuration of the robot hand 103 according to this embodiment. The robot hand 103 has three fingers 130a, 130b, and 130c for holding an object 105 and has suction mechanisms 131a, 131b, and 131c at the tips of the fingers 130a, 130b, and 130c, respectively. In each of the suction mechanisms 131a, 131b, and 131c, a suction cup of each of the suction mechanisms 131a, 131b, and 131c is connected to a pump for generating a negative pressure via a tube, thereby suctioning the object 105 at the time of holding the object 105. A force by which the suction mechanisms 131a, 131b, and 131c suction the object 105 is referred to as a suction force. A surface including an outer peripheral edge of the suction cup of each of the suction mechanisms 131a, 131b, and 131c when the robot hand 103 does not hold an object is referred to as a nonuse suction surface. In the robot hand 103 illustrated in FIG. 2, the nonuse suction surface is parallel to a surface on which each of the suction mechanisms 131a, 131b, and 131c is disposed in the corresponding fingers 130a, 130b, and 130c.

Figure 3:
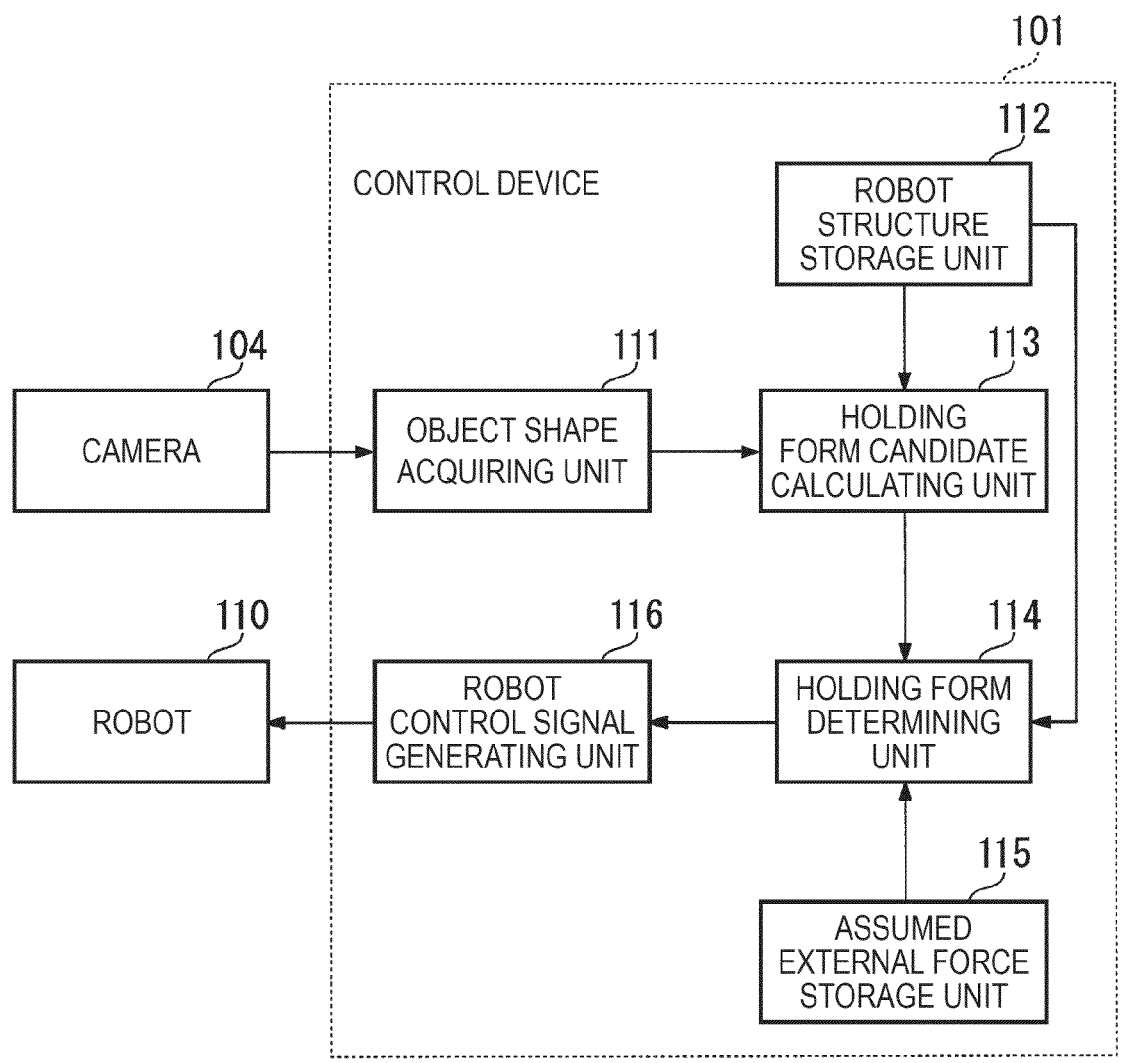
FIG. 3 is a block diagram schematically illustrating a configuration of a control device according to the first embodiment of the invention.

FIG. 3 is a block diagram schematically illustrating the configuration of the control device 101 according to this embodiment. The control device 101 includes an object shape acquiring unit 111, a robot structure storage unit 112, a holding form candidate calculating unit 113, a holding form determining unit 114, an assumed external force storage unit 115, and a robot control signal generating unit 116. The object shape acquiring unit 111 calculates shape data indicating the shape of the object 105 with reference to an image signal input from the camera 104. In this embodiment, the object shape acquiring unit 111 calculates the shape of the object 105 with reference to the image signal from the camera 104, but may acquire the shape data indicating a shape formed by a computer aided design (CAD) or the like from another device.

The robot structure storage unit 112 stores information indicating the structure of the robot 110 such as a bendable range and an allowable torque of each joint of the robot 110, lengths of support members between the joints, and the suction force of each suction mechanism. The holding form candidate calculating unit 113 calculates all holding forms in which an object 105 can be held with the structure of the robot 110 with reference to the shape data of the object 105 acquired by the object shape acquiring unit 111 and information indicating the structure of the robot 110 stored in the robot structure storage unit 112, and sets the calculated holding forms as holding form candidates $P_j$ (j=1, 2, ..., Ng). Here, Ng represents the number of holding form candidates. In this embodiment, the holding form candidates $P_j$ are information including contact positions $r_i$ (i=1, 2, 3) of the fingers 130a, 130b, and 130c of the robot hand 103 with the object 105.

The assumed external force storage unit 115 stores magnitudes and directions of external forces assumed to be applied to the object 105 during work and moments due to the external forces in advance. The holding form determining unit 114 selects a holding form in which the object 105 can be stably held even when the external forces stored in the assumed external force storage unit 115 are applied to the object 105 out of the holding forms candidates $P_j$ calculated by the holding form candidate calculating unit 113. Details of the holding form selecting method will be described later.

In the holding form determining unit 114 according to this embodiment, a continuous stably-holdable condition includes that a component, in a direction parallel to the contact surface of each of the fingers 130a, 130b, and 130c with the object 105, of a force applied from the corresponding finger to the object 105 is equal to or less than a value obtained by multiplying a predetermined friction coefficient by a combined force of a component in a direction perpendicular to the contact surface of the force and the suction force due to the suction mechanism of the corresponding finger. The robot control signal generating unit 116 controls the robot 110 so that the robot 110 holds the object 105 in the holding form determined by the holding form determining unit 114.

Figure 4:
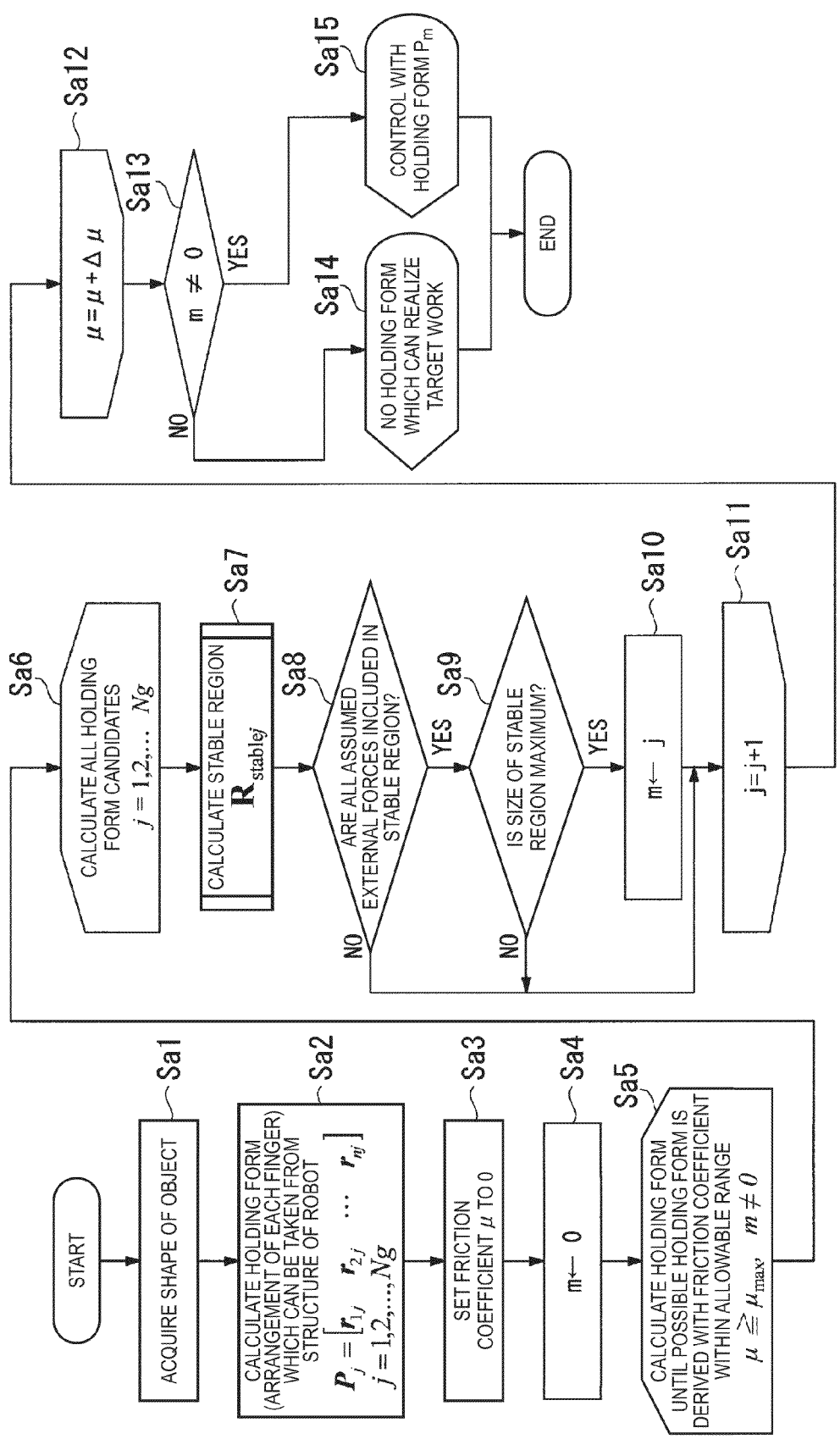
FIG. 4 is a flowchart illustrating an operation of the control device according to the first embodiment of the invention.

FIG. 4 is a flowchart illustrating the operation of the control device 101 according to this embodiment. First, the object shape acquiring unit 111 of the control device 101 calculates shape data of an object 105 with reference to an image signal input from the camera 104 (step Sa1). Then, the holding form candidate calculating unit 113 calculates all holding form candidates $P_j$ (j=1, 2, ..., Ng) expressed by Expression (1) with reference to the shape data calculated in step Sa1 and information indicating the structure of the robot 110 stored in the robot structure storage unit 112 (step Sa2).

$$P_j = [r_{1j} r_{2j} r_{3j}]$$

$$j = 1, 2, \ldots, Ng \quad (1)$$

In the expression, $r_{ij}$ represents a vector indicating a contact point of the i-th finger with the object 105 in the j-th holding form candidate.

Then, the holding form determining unit 114 assumes that the friction coefficient μ at the contact point of each of the fingers 130a, 130b, and 130c with the object 105 is "0" (step Sa3). The holding form determining unit 114 initializes a parameter m to "0" (step Sa4). The parameter m is a parameter for storing the index j of the stably-holdable holding form candidate detected in the following loop. Then, the holding form determining unit 114 repeatedly performs the processes of steps Sa6 to Sa11 described below while gradually increasing the value of the friction coefficient μ until the friction coefficient μ is equal to or more than a predetermined maximum friction coefficient $\mu_{max}$ ($\mu \geq \mu_{max}$) or the parameter m is not 0 (m≠0) (step Sa5).

The holding form determining unit 114 performs the processes of steps Sa7 to Sa10 on each j=1, 2, ..., Ng as follows (step Sa6). That is, the holding form determining unit 114 performs the processes of steps Sa7 to Sa10 on all the holding form candidates $P_j$. First, in step Sa7, the holding form determining unit 114 calculates a stable region $R_{stablej}$ in the corresponding holding form candidate $P_j$ (step Sa7). The stable region $R_{stablej}$ represents a set of vectors indicating a maximum external force (allowable external force) with which an object can be stably held in the corresponding holding form candidate $P_j$ in each operating point and each direction of the external force. Hereinafter, a case where an operating point of the external force is one will be described for the purpose of convenience for explanation. The method of calculating the stable region $R_{stablej}$ will be described later.

Then, the holding form determining unit 114 determines whether all the assumed external forces stored in the assumed external force storage unit 115 are included in the stable region $R_{stablej}$ (step Sa8). That is, for each assumed external force, the holding form determining unit 114 determines whether the magnitude in the same direction as the corresponding assumed external force in the stable region $R_{stablej}$ is larger than the corresponding assumed external force. When some assumed external force is not included in the stable region $R_{stablej}$ (NO in step Sa8), the process flow goes to step Sa11.

On the other hand, when all the assumed external forces are included in the stable region $R_{stablej}$ (YES in step Sa8), the holding form determining unit 114 determines whether the size (volume) of the stable region $R_{stablej}$ is a maximum of the stable regions of the stably-holdable holding form candidates detected hitherto (step Sa9). Specifically, the holding form determining unit 114 determines whether the size of the stable region $R_{stablej}$ is larger than a stable region $R_{stablem}$. When m is "0", the size of the stable region $R_{stablem}$ is "0". When the size of the stable area is the maximum (YES in step Sa9), the value of j is substituted for the parameter m (step Sa10) and then the process flow goes to step Sa11. When the size of the stable area is not the maximum (NO in step Sa9), the process flow goes to step Sa11 without performing any process.

In step Sa11, the holding form determining unit 114 determines an end condition of the loop defined in step Sa6. That is, the process flow goes to step Sa12 when the holding form determining unit 114 completely performs the processes of steps Sa7 to Sa10 on all of j=1, 2, ..., Nf, and j is increased and the process flow returns to step Sa7 otherwise.

In step Sa12, the holding form determining unit 114 determines an end condition of the loop defined in step Say. That is, the holding form determining unit 114 ends the loop and performs the process of step Sa13 when the parameter m is not "0" or $\mu \geq \mu_{max}$, and increases the value of the friction coefficient $\mu$ by $\Delta\mu$ and performs the process of step Sa6 again otherwise.

In step Sa13, the holding form determining unit 114 determines whether the parameter is not 0 (m≠0). When it is determined that the parameter m satisfies m≠0 (YES in step Sa13), the holding form determining unit 114 selects the holding form candidate $P_m$ as a holding form in which the object 105 can be stably held, and the robot control signal generating unit 116 controls the robot 110 so that the robot 110 holds the object 105 in the selected holding form.

When it is determined in step Sa13 that the parameter m does not satisfy m≠0 (NO in step Sa13), the holding form determining unit 114 notifies that there is no holding form in which the object 105 can be stably held and the process flow ends.

Figure 5:
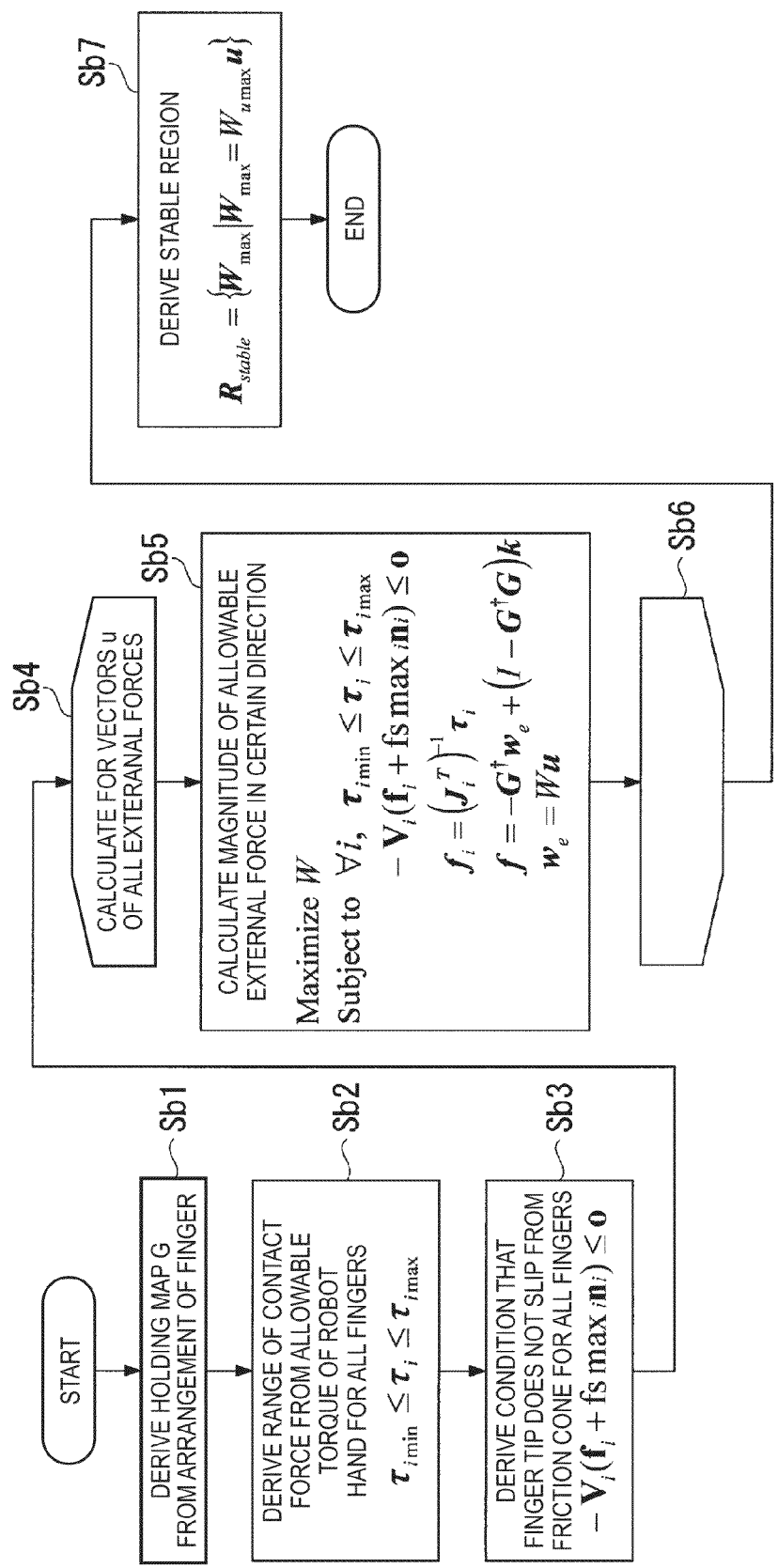
FIG. 5 is a flowchart illustrating a process of calculating a stable region in a holding form determining unit according to the first embodiment of the invention.

FIG. 5 is a flowchart illustrating a process of calculating a stable region in the holding form determining unit 114. The flowchart of FIG. 5 is a flowchart illustrating the process of step Sa7 in FIG. 4. First, the holding form determining unit 114 derives a holding map G from the arrangement of the finger indicated by the holding form candidate $P_j$ (step Sb1). Here, the holding map G is a matrix defined by Expression (2).

$$G = \begin{bmatrix} I_3 & I_3 & I_3 \\ [r_1 X] & [r_2 X] & [r_3 X] \end{bmatrix} \quad (2)$$

Here, $I_3$ represents a unit matrix of three rows and three columns and $[r_i X]$ represents a matrix defined by Expression (3). $(r_{ix}, r_{iy}, r_{iz})$ is a coordinates of a point at which the i-th finger comes in contact with the object 105 in the holding form Pj.

$$[r_i X] = \begin{bmatrix} 0 & -r_{iz} & r_{iy} \\ r_{iz} & 0 & r_{ix} \\ -r_{iy} & r_{ix} & 0 \end{bmatrix} \quad (3)$$

Then, the holding form determining unit 114 derives a range of a contact force from the allowable torque, which is stored in the robot structure storage unit 112, of a driving unit such as a motor for driving each joint of the robot hand 103 for all the fingers 130a, 130b, and 130c (step Sb2). Here, the contact force is a torque generated by the driving unit of each joint so as to generate a force applied from each of the fingers 130a, 130b, and 130c to the object 105 and is expressed by a vector. For example, the contact force $f_i$ of the i-th finger has an x-axis turn component, a y-axis turn component, and a z-axis turn component of a torque $\tau_i$ generated by the driving unit of each joint of the i-th finger as elements. Therefore, the contact force $f_i$ has elements corresponding to the number obtained by multiplying the number of driving units driving the joints of the i-th finger by 3. Here, when the elements of the driving torque $\tau_i$ of the i-th finger lie between the minimum value and the maximum value of the allowable torque, it is expressed by $\tau_{imin} \leq |\tau_i| \leq \tau_{imax}$.

Then, the holding form determining unit 114 derives a condition in which the finger tip does not slip from a friction cone for all the fingers 130a, 130b, and 130c (step Sb3). The condition in which the i-th finger tip does not slip is that the component, in the direction parallel to the contact surface, of the contact force which is a force applied to the object 105 by driving the finger tip by the use of the corresponding driving unit is equal to or less than a value obtained by multiplying the friction coefficient $\mu$ by a combined force of a force (component in the direction perpendicular to the contact surface) pressing the contact surface of the contact force applied from the finger tip to the object 105 and the suction force of the suction mechanism. A cone drawn by a set of force vectors satisfying this configuration and applied from the finger tip to the object 105 is referred to as friction cone. This friction cone is determined by the contact force, the suction force, and the friction coefficient $\mu$. In this embodiment, the condition in which the finger tip does not slip is expressed by Expression (4). Expression (4) approximates the friction cone to a polygonal pyramid. Expression (4) and details of the deriving method thereof will be described later.

$$-V_i (f_i + f_{smax,i} n_i) \leq 0 \quad (4)$$

Here, the contact force $f_i$ is a force applied to the object 105 by driving the joints of the i-th finger by the use of a motor or the like. The contact force $f_i$ is also a force to be generated by each finger so as to generate resistance to an external force. $fsmax_i$ represents the maximum value of the suction force of the suction mechanism of the i-th finger. The vector $n_i$ is a unit normal vector of the contact surface of the i-th finger with the object 105. The vector $n_i$ is directed to the inside of the object 105. The vector $V_i$ is a set of normal vectors of polygonal faces of the polygonal pyramid approximating the friction cone. This normal vector is also directed to the inside of the polygonal pyramid. The non-slip condition is that Expression (4) is established for all the unit normal vectors included in $V_i$.

Then, the holding form determining unit 114 selects a non-processed combination out of the combinations of the direction and the operating point of an external force so as to perform the process of step Sb5 on the directions and the operating points of all the external forces, and selects a vector u corresponding to the selected combination (step Sb4). The vector u has an x-axis component, a y-axis component, a z-axis component of an external force applied to the object 105 and the x-axis turn component, a y-axis turn component, and a z-axis turn component of the moment due to the external force as elements, when an external force with a magnitude 1 in the selected direction is applied to the selected operating point. Then, in step Sb5, the maximum value of the magnitude W of the external force with the operating point and the direction corresponding to the vector u selected in step Sb4 and satisfying the ranges of the elements of the driving torque $\tau_i$ in step Sb2 and the condition of Expression (4) in step Sb3 is calculated. The calculation of the maximum value is performed by solving the following expression using a known linear programming method.

$$\text{Maximize } W$$

$$\text{Subject } \forall i,$$

$$\tau_{imin} \le \tau_i \le \tau_{imax} \; -V_i(f_i + fsmax_i n_i) \le 0$$

$$f_i = (J_i^T)^{-1}\tau_i$$

$$f = -G^\dagger w_e + (I - G^\dagger G)k$$

$$w_e = Wu$$

Here, $$f = \begin{pmatrix} f_1 \\ f_2 \\ f_3 \end{pmatrix} \; G^\dagger = G^T(GG^T)^{-1}$$

In the above expression, a matrix $J_i$ represents a Jacobian matrix for transforming the contact force $f_i$ to the driving torque $\tau_i$, and varies depending on the holding form when each of the fingers 130a, 130b, and 130c has plural joints as illustrated in FIG. 2. The vector $w_e$ has an x-axis component, a y-axis component, and a z-axis component of an external force applied to the object 105 and an x-axis turn component, a y-axis turn component, and a z-axis turn component of a moment as elements, when the external force with a magnitude W is applied to the operating point and in the direction corresponding to the vector u. The vector k is a vector appearing because the matrix G is not a square matrix. Accordingly, the above-mentioned expression is solved by substituting values in a predetermined range for the vector k, and the maximum value of W thereof is set as the solution.

Then, the holding form determining unit 114 determines whether the directions of all the external forces are completely processed (step Sb6). When the directions of all the external forces are completely processed, the holding form determining unit 114 sets the set of vectors Wmax obtained by multiplying the maximum value Wmax of the external forces in the directions by the unit vector u in the corresponding directions as the stable region $R_{stable}$ (step Sb7), and ends the process flow. When there is a non-processed direction, the process flow returns to step Sb4.

Figure 6:
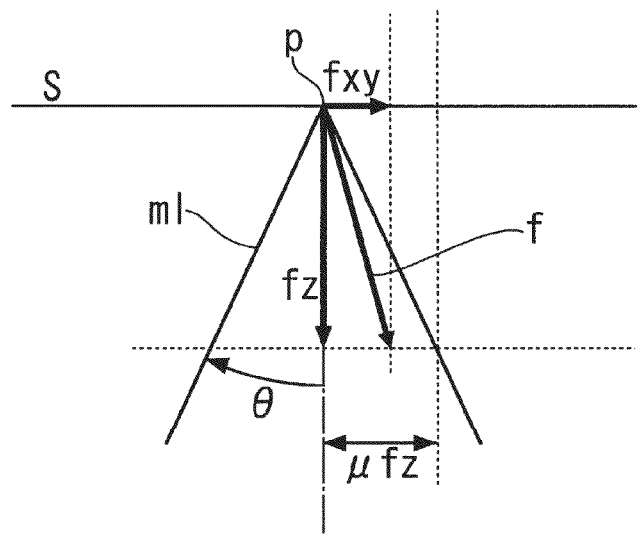
FIG. 6 is a conceptual diagram illustrating a non-slip condition when there is not a suction mechanism.

FIG. 6 is a conceptual diagram illustrating a non-slip condition when there is no suction mechanism. FIG. 6 illustrates a case where i indicating the numbers of the fingers is omitted and the contact force f from the i-th finger of the robot hand 103 is applied to the contact point p on the contact surface S of the object 105. Here, for the purpose of convenience of explanation, the contact surface is set to a plane parallel to the XY plane. The frictional force is μfz obtained by multiplying the component fz of the contact force f perpendicular to the contact surface S by the friction coefficient μ. Therefore, the non-slip condition is that the component fxy of the contact force f parallel to the contact surface is equal to or less than the frictional force μfz. Here, when tan θ=μ is set, a cone can be considered which has a line ml passing through the operating point p and forming an angle of θ with the normal line of the contact surface as a generatrix. Then, when the contact force f is included in the cone, fxy≤μfz is established. Accordingly, the non-slip condition can be said that the contact force f is included in the cone.

Figure 7:
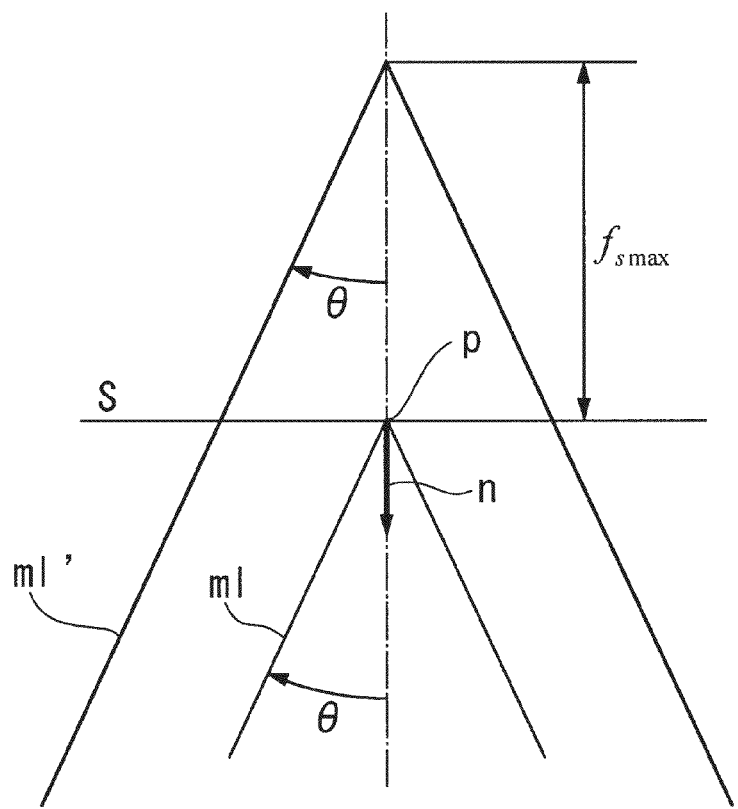
FIG. 7 is a conceptual diagram illustrating a non-slip condition when there is a suction mechanism.

FIG. 7 is a conceptual diagram illustrating a non-slip condition when there is a suction mechanism. Similarly to FIG. 6, it is assumed that i indicating the numbers of the fingers is omitted and the contact force f is applied from the i-th finger of the robot hand 103 to the contact point p on the contact surface S of the object 105. When there is a suction mechanism, the frictional force is μ(fz+fsmax) obtained by multiplying the friction coefficient μ by a combined force of the component fz of the contact force f perpendicular to the contact surface S and the suction force fsmax of the suction mechanism. That is, fxy≤μ(fz+fsmax) is a non-slip condition. This condition can be said that the contact force f is included in a cone (cone having a line ml' as a generatrix) obtained by translating the cone (cone having a line ml as a generatrix) when there is no suction mechanism to the outside of the contact surface S by the suction force fsmax. The non-slip condition can also be said that a combined force of a vector obtained by multiplying the suction force fsmax by the unit normal vector n of the contact surface S and the contact force f is included in the cone (cone having a line ml as a generatrix) when there is no suction mechanism.

Figure 8:
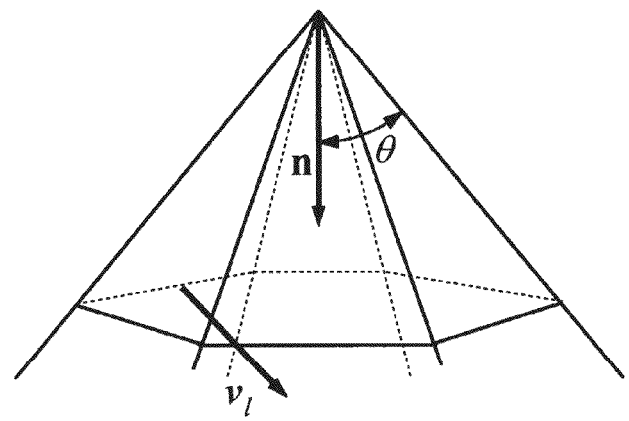
FIG. 8 is a conceptual diagram illustrating an approximation of a cone to a polygonal pyramid according to the first embodiment of the invention.

FIG. 8 is a conceptual diagram illustrating an approximation of a cone to a polygonal pyramid. In this embodiment, the non-slip condition described with reference to FIG. 7 in which the combined force of the vector obtained by multiplying the suction force fsmax by the unit normal vector n of the contact surface S and the contact force f is included in the cone (cone having a line ml as a generatrix) when there is no suction mechanism is approximated to a polygonal pyramid. That is, the non-slip condition is set to a condition in which the combined force of the vector obtained by multiplying the suction force fsmax by the unit normal vector n of the contact surface S and the contact force f is included in a polygonal pyramid approximating the cone.

FIG. 8 illustrates a case where a cone is approximated to a hexagonal pyramid. The hexagonal pyramid illustrated in FIG. 8 is a hexagonal pyramid inscribed in the cone having a line ml as a generatrix. Therefore, an angle formed by the sides of the hexagonal pyramid and the unit normal vector n of the contact surface S is θ. When a vector a is included in the hexagonal pyramid, it means that all the angles formed by all the normal vectors $v_l$ of the faces of the hexagonal pyramid directed to the inside of the hexagonal pyramid and the vector a are equal to or less than 90 degrees. That is, for all the vectors $v_l$, the inner product of the normal vector $v_l$ and the vector a has a positive value.

When this is applied to the non-slip condition, the inner product of the normal vector $v_l$ and the combined force of the vector obtained by multiplying the unit normal vector n of the contact surface S by the suction force fsmax and the contact force f has a positive value for all the normal vectors $v_l$. This can be expressed by Expression (5). By multiplying both sides by −1 and replacing the set of the normal vectors $v_l$ with $V_i$, Expression (6), that is, Expression (4), is obtained.

$$v_l(f_i+fsmax_i n_i)\ge 0 \tag{5}$$

$$-V_i(f_i+fsmax_i n_i)\le 0 \tag{6}$$

Figure 9:
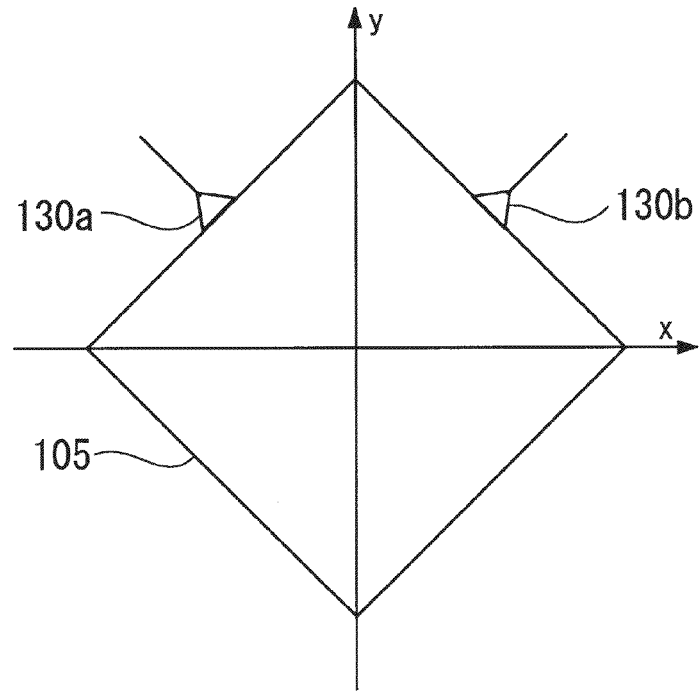
FIG. 9 is a plan view illustrating a holding form in a stable region illustrated in FIGS. 10 and 11 according to the first embodiment of the invention.
Figure 10:
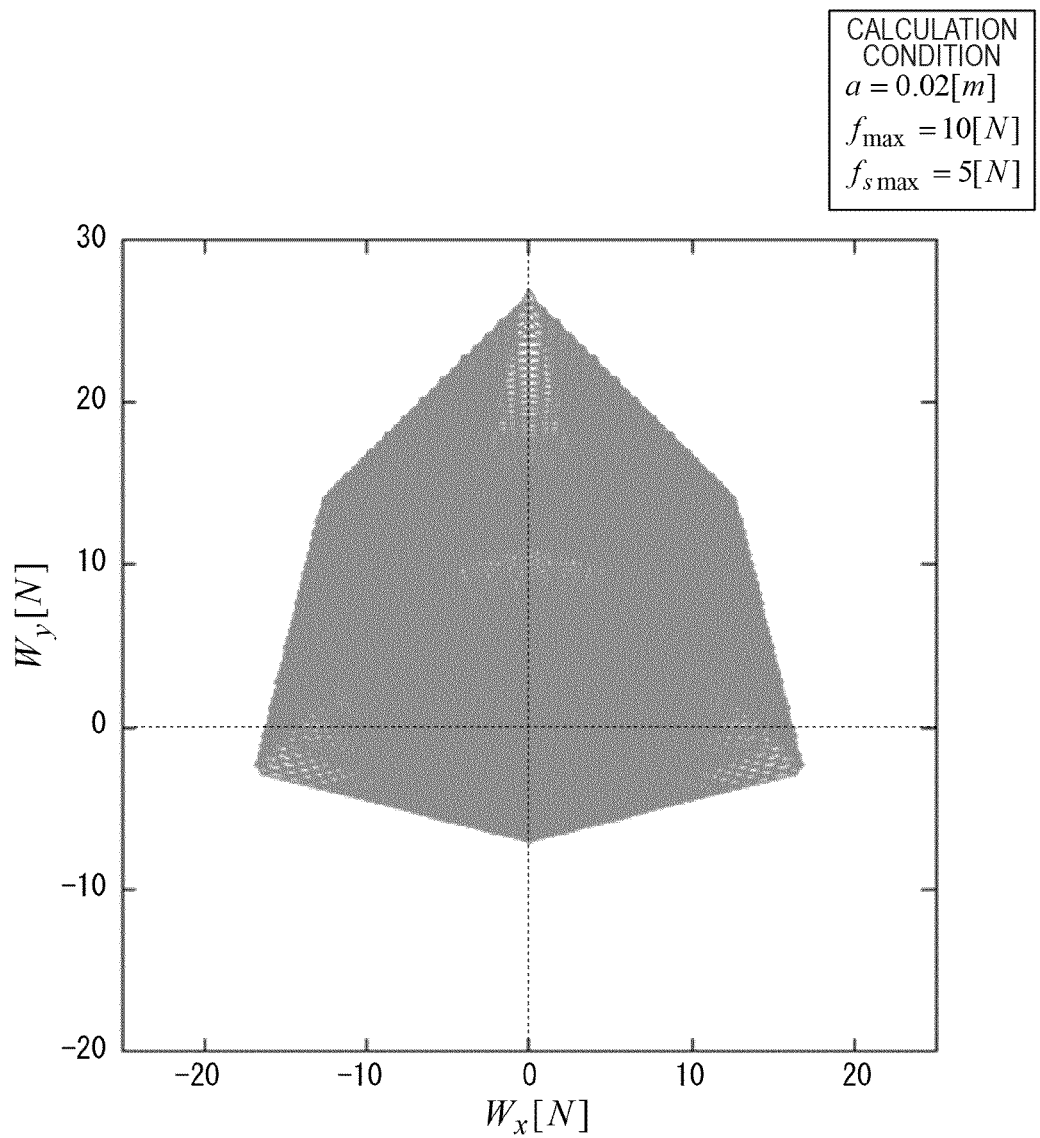
FIG. 10 is a plan view illustrating the stable region of the holding form illustrated in FIG. 9 according to the first embodiment of the invention.
Figure 11:
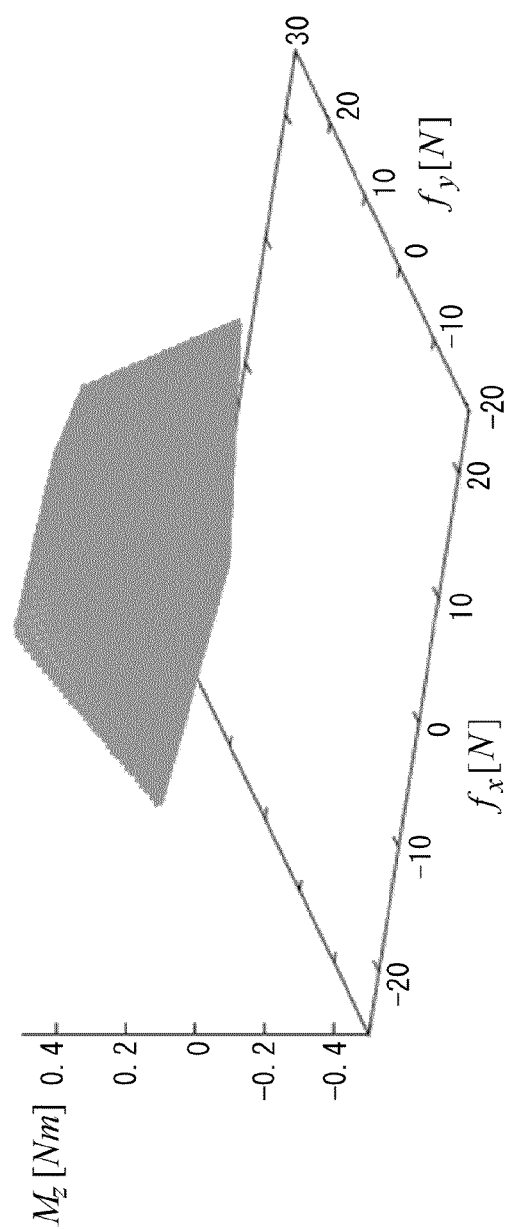
FIG. 11 is a perspective view illustrating the stable region of the holding form illustrated in FIG. 9 according to the first embodiment of the invention.

FIG. 9 is a plan view illustrating a holding form of a stable region illustrated in FIGS. 10 and 11. In order to simplify explanation, it is assumed that the robot hand 103 has two fingers 130a and 130b. As described with reference to the flowchart of FIG. 5, the holding form determining unit 114 calculates a stable region for each holding form. In the example of the holding form illustrated in FIG. 9, the object 105 has a square shape and a coordinate system is taken with the center of gravity of the square as an origin, one diagonal thereof as an x axis, and the other diagonal thereof as a y axis. The finger 130a and the finger 130b symmetrically come in contact with the object 105 from the positive direction of the y axis of the object 105 to hold the object 105.

FIG. 10 is a plan view illustrating the stable region of the holding form illustrated in FIG. 9. In FIG. 10, the horizontal axis represents the x-axis component Wx [N] of an allowable external force and the vertical axis represents the y-axis component $W_y$ [N] of the allowable external force. The shape of the stable region illustrated in FIG. 10 is symmetric in the x-axis direction, but the plus side is larger than the minus side in the y-axis direction. That is, it can be seen that the allowable external force is larger in the positive direction of the y axis which is a direction in which the fingers 130a and 130b are pressed and the allowable external force is small in the negative direction of the y axis which is a direction in which the fingers 130a and 130b are attracted.

FIG. 11 is a perspective view illustrating the stable region of the holding form illustrated in FIG. 9. In FIG. 11, the obliquely-protruding axis represents the x-axis component Wx [N] of an allowable external force and the obliquely-recessing axis represents the y-axis component of the allowable external force. The axis perpendicular to these axes represents a z-axis turn moment Mz [Nm] of the allowable external force. Since the value of the z-axis component is smaller than the values of the x-axis component and the y-axis component, it can be seen that the allowable external force in the direction perpendicular to the xy plane of FIG. 9 is small. In FIG. 11, the allowable external force in the x-axis direction, the x-axis turn moment, the y-axis turn moment, and the z-axis turn moment are not shown.

In this way, since the condition in which an object can continue to be stably held includes that the force to be generated by each of the fingers 130a, 130b, and 130c so as to generate resistance to an assumed external force is included in the friction cone formed by the friction coefficient, the suction force of the suction mechanism of the corresponding finger, and the contact force generated by driving the corresponding finger, the holding form determining unit 114 according to this embodiment can determine a holding form in which the object 105 can continue to be stably held so as not to slip on the contact surface in advance even when a predetermined assumed external force is applied thereto.

The holding form determining unit 114 searches for the holding forms in which the object can continue to be stably held while gradually increasing the friction coefficient from 0 to the maximum value and selects the first-searched holding form, when selecting a holding form out of holding form candidates. Accordingly, a holding form which is established even with the smallest friction coefficient can be selected out of the holding forms in which the object can continue to be stably held. Therefore, even when the friction coefficient decreases due to aging degradation of the robot hand 103 or the like, it is possible to employ a holding form in which an object can continue to be stably held.

In this embodiment, the holding forms are searched while slowly increasing the friction coefficient from 0 to the maximum value and a first-searched holding form is used in order to select a holding form which is established even with the smallest friction coefficient, but a holding form having the smallest friction coefficient out of the holding forms found by searching the holding forms with the friction coefficients from 0 to the maximum value may be selected.

Second Embodiment

In the first embodiment, the positions at which the fingers 130a, 130b, and 130c of the robot hand 103 come in contact with an object 105 are defined as the holding form. In a second embodiment, the angles formed by the suction mechanisms and the contact surfaces in addition to the positions at which the fingers 130a, 130b, and 130c comes in contact with an object are defined as a holding form. A robot system according to the second embodiment has the same configuration as illustrated in FIG. 1, but is different from the robot system illustrated in FIG. 1 in only parts of the holding form candidate calculating unit 113 and the holding form determining unit 114 of the control device 101. Accordingly, the differences will be described and the other configuration will not be repeated. First, a relationship between the angle formed by the suction mechanism and the contact surface and the suction force will be described below.

Figure 12:
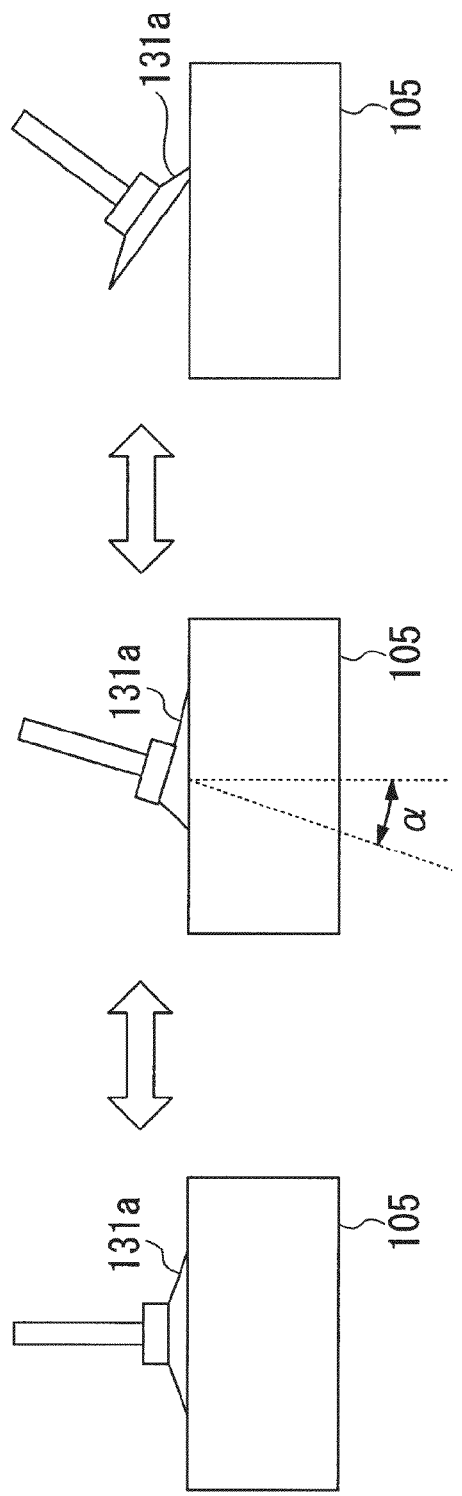
FIG. 12 is a diagram illustrating a variation in a contact state depending on an angle formed by a suction mechanism and a contact surface according to a second embodiment of the invention.

FIG. 12 is a diagram illustrating a variation in contact state depending on an angle formed by a suction mechanism and a contact surface. The left side of FIG. 12 illustrates a case where the suction mechanism 131a comes in contact with the object 105 in a state where the angle formed by the normal line of the nonuse suction surface of the suction mechanism 131a and the normal line of the contact surface of the object 105 is 0 degree. In this case, the area by which the suction cup of the suction mechanism 131a comes in contact with the object 105 is a maximum and the suction force $fsmax_i$ is a maximum. The nonuse suction surface is a surface including an outer peripheral edge of each suction cup of the suction mechanisms 131a, 131b, and 131c when the robot hand 103 does not hold anything as described above.

The middle side of FIG. 12 illustrates a case where the suction mechanism 131a comes in contact with the object 105 in a state where the angle formed by the normal line of the nonuse suction surface of the suction mechanism 131a and the normal line of the contact surface of the object 105 is α degree. In this case, since the suction cup of the suction mechanism 131a is attracted, the contact area with the object 105 is smaller than that on the left side of FIG. 12 and thus the suction force $fsmax_i$ is smaller than the maximum value. The right side of FIG. 12 illustrates a case where one side of the suction cup is separated from the object 105 because the angle formed by the normal line of the nonuse suction surface of the suction mechanism 131a and the normal line of the contact surface of the object 105 is large. In this case, the suction force $fsmax_i$ of the suction mechanism 131a is about "0".

Figure 13:
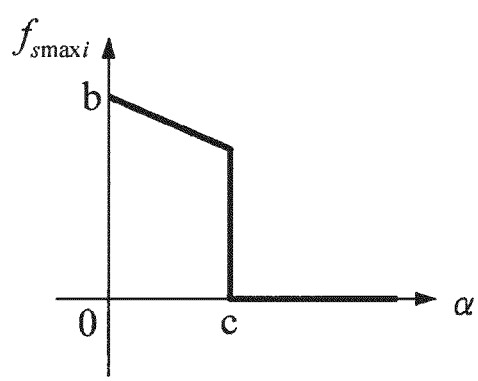
FIG. 13 is a graph illustrating a relationship between the angle formed by a normal line of a suction surface and a normal line of a contact surface in nonuse of a suction mechanism and a suction force according to the second embodiment of the invention.

FIG. 13 is a graph illustrating a relationship between the angle formed by the normal line of the nonuse suction surface of the suction mechanism and the normal line of the contact surface and the suction force. In FIG. 13, the horizontal axis represents the angle α formed by the normal line of the nonuse suction surface of the suction mechanism and the normal line of the contact surface and the vertical axis represents the suction force $fsmax_i$. As illustrated in FIG. 12, when the angle α formed by the normal line of the nonuse suction surface of the suction mechanism and the normal line of the contact surface is 0 degree, the suction force $fsmax_i$ has the maximum value b, and the suction force $fsmax_i$ decreases as the angle α increases. When the angle α is larger than a predetermined value c, the suction force $fsmax_i$ is about "0". This relationship can be expressed by Expression (7).

$$fsmax_i = \begin{cases} -a\alpha + b, & 0 \le \alpha < c \\ 0, & c \le \alpha \end{cases} \quad (7)$$

Figure 14:
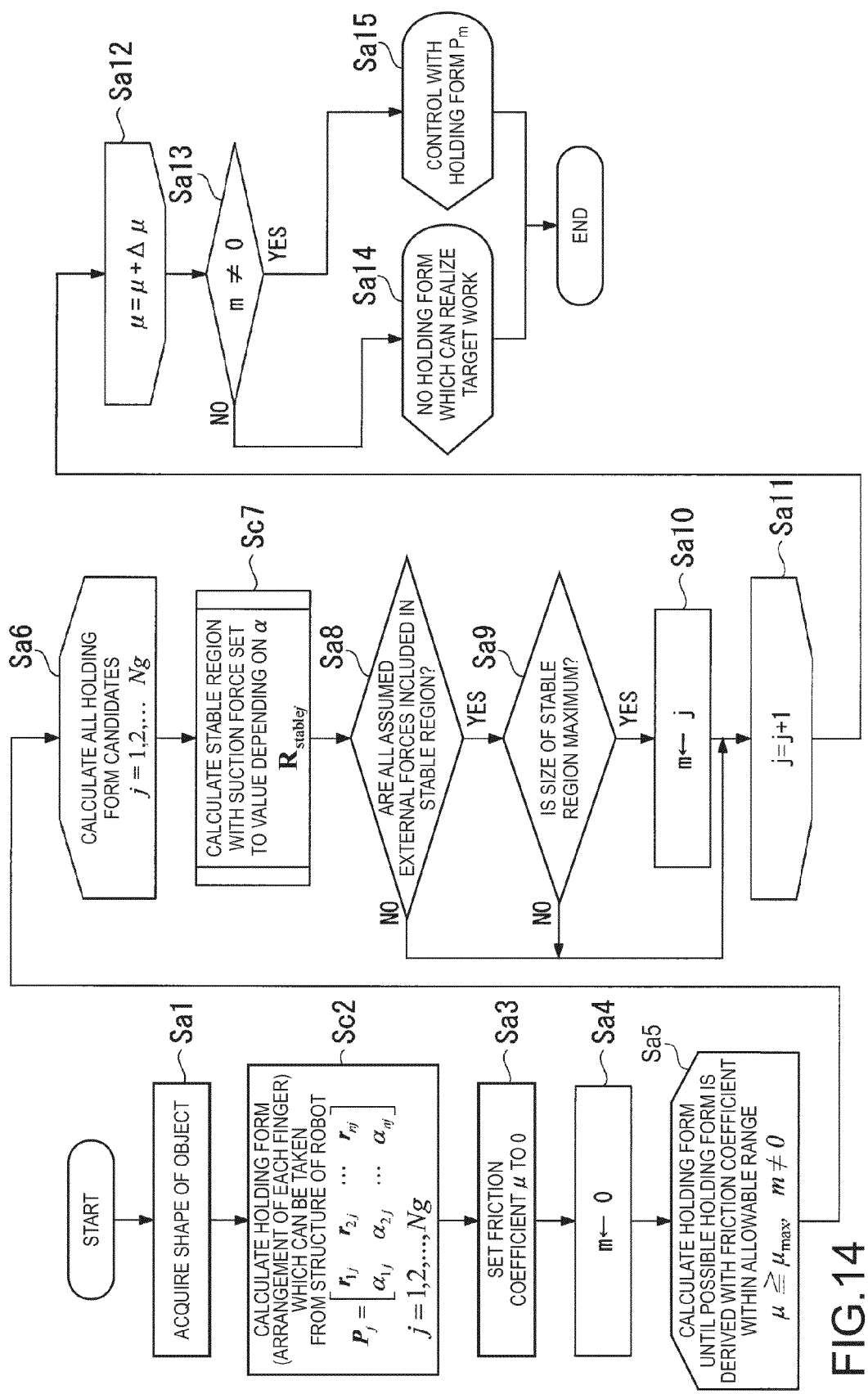
FIG. 14 is a flowchart illustrating an operation of a control device according to the second embodiment of the invention.

FIG. 14 is a flowchart illustrating the operation of the control device 101 according to this embodiment. The flowchart illustrated in FIG. 14 is different from the flowchart illustrated in FIG. 4, in that steps Sa2 and Sa7 are replaced with steps Sc2 and Sc7, respectively. In step Sc2, the holding form candidate calculating unit 113 calculates all candidates $P_j$ (j=1, 2, ..., Ng) of the holding form expressed by Expression (8) with reference to the shape data calculated in step Sa1 and the information, which is stored in the robot structure storage unit 112, indicating the structure of the robot 110.

$$P_j = \begin{bmatrix} r_{1j} & r_{2j} & r_{3j} \\ \alpha_{1j} & \alpha_{2j} & \alpha_{3j} \end{bmatrix} \quad (8)$$

$$j = 1, 2, \ldots, Ng$$

In the expression, $r_{ij}$ represents a vector indicating a contact point of the i-th finger with an object 105 in the j-th holding form candidate. $\alpha_{ij}$ represents an angle formed by a normal line of a nonuse suction surface of a suction mechanism of the i-th finger and a normal line of a contact surface of the object 105 in the j-th holding form candidate.

In step Sc7, the holding form determining unit 114 calculates a stable region similarly to step Sa2, but the suction force $fsmax_i$ is calculated using Expression (7) instead of being set to a fixed value as in step Sa2. That is, the stable region is calculated with the suction force $fsmax_i$ set to a value depending on the angle $\alpha$.

In this way, according to this embodiment, it is possible to appropriately determine a holding form in which the robot hand 103 having a suction mechanism can continue to stably hold the object 105, similarly to the first embodiment. It is also possible to select a holding form which is established with the smallest friction coefficient out of the holding forms in which the object can continue to be stably held.

In this embodiment, the angles $\alpha_{1j}$, $\alpha_{2j}$, and $\alpha_{3j}$ formed by the normal lines of the nonuse suction surfaces of the suction mechanisms 131a, 131b, and 131c and the normal lines of the contact surfaces of the object 105 in addition to the positions of the fingers 130a, 130b, and 130c are included in the holding form candidates $P_j$ and the suction force $fsmax_i$ is set to values depending on these angles. Accordingly, it is possible to appropriately determine a holding form in which the object can continue to be stably held even when the suction force greatly varies depending on the angle $\alpha$.

In Expression (7), the suction force is the maximum when the angle $\alpha$ formed by the normal line of the nonuse suction surface of the suction mechanism and the normal line of the contact surface of the object 105 is 0 degree. Accordingly, the control device 101 according to the second embodiment controls the robot 101 so that the normal lines of the nonuse suction surfaces of the suction mechanisms 131a, 131b, and 131c are perpendicular to the corresponding contact surfaces of the object 105.

In the above-mentioned embodiments, the robot hand 103 has three fingers 130a, 130b, and 130c, but the number of fingers may be one or two or more than three.

All the fingers of the robot hand 103 have a suction mechanism, but only apart thereof may have a suction mechanism. In this case, the suction force $fsmax_i$ of the finger not having a suction mechanism is 0.

The suction mechanism may be a simple suction cup not connected to a pump or may be a magnet such as an electromagnet.

FIG. 1 illustrates a case where the manipulator 102 has six axes, but any manipulator such as a manipulator having the number of axes less than six or the number of axes equal to or more than seven and a manipulator installed in a traveling machine may be employed.

The control device 101 may be embodied by recording the program for realizing the functions of the control device 101 illustrated in FIG. 1 on a computer-readable recording medium, reading the program recorded on the recording medium into a computer system, and executing the program. Here, the "computer system" includes an OS and hardware such peripherals.

The "computer-readable recording medium" means a storage device such as a portable medium such as a flexible disk, a magnetic-optical disk, a ROM, and a CD-ROM and a hard disk built in a computer system. The "computer-readable recording medium" includes a medium dynamically holding a program for a short time, such as a communication line in a case where a program is transmitted through a network such as Internet or a communication line such as a telephone line, and a medium holding a program for a predetermined time, such as a volatile memory in a computer system serving as a server or a client in that case. The program may realize a part of the above-mentioned functions or may realize the above-mentioned functions by combination with a program recorded in advance in a computer.

While the embodiments of the invention have been described, the invention is not limited to the embodiments and can be modified in various forms without departing from the gist of the invention.

The entire disclosure of Japanese Patent Application No.: 2013-015992, filed Jan. 30, 2013 is expressly incorporated by reference herein.

What is claimed is:

1. A robot control method of a robot that has a suction mechanism for at least one contact portion coming in contact with an object to hold the object and that holds the object, the robot control method comprising:
   selecting a holding form in which at least a position on the object coming in contact with the at least one contact portion is specified as a holding form in which the robot holds the object; and
   determining in advance whether the object can continue to be stably held when a predetermined external force is applied to the object in the selected holding form,
   wherein it is determined that the object can continue to be stably held when a force which should be generated by the at least one contact portion to generate resistance to the predetermined external force is included in a friction cone of a force generated by driving the at least one contact portion and enlarged by a suction force from the suction mechanism; and
   generating a control signal for controlling the robot so that the robot holds the object in the determined holding form.

2. The robot control method according to claim 1, wherein the suction force of the suction mechanism is set to a value based on an angle formed by a contact surface of the object coming in contact with the suction mechanism and the suction mechanism.

3. The robot control method according to claim 1,
   further comprising selecting the holding form in which a predetermined friction coefficient is the minimum out of the holding forms in which it is determined that the object can continue to be stably held when the selecting of the holding form and the determining of whether the object can continue to be stably held are performed with the predetermined friction coefficient set to a value in a predetermined range.

4. A robot control device controlling a robot that has a suction mechanism for at least one contact portion coming in contact with an object to hold the object and that holds the object, the robot control device comprising:
- a holding form determining unit that determines a holding form in which at least a position on the object coming in contact with the at least one contact portion is specified in advance as the holding form in which the object can continue to be stably held even when a predetermined external force is applied to the object; and
- a robot control signal generating unit that generates a signal for controlling the robot so that the robot holds the object in the determined holding form,
- wherein the holding form determining unit determines that the object can continue to be stably held even when the predetermined external force is applied to the object, when a force which should be generated by the at least one contact portion to generate resistance to the predetermined external force is included in a friction cone formed by a friction coefficient and a suction force from the suction mechanism.

5. A robot that has a suction mechanism for at least one contact portion coming in contact with an object to hold the object and that holds the object, the robot comprising:
- a holding form determining unit that determines a holding form in which at least a position on the object coming in contact with the at least one contact portion is specified in advance as the holding form in which the object can continue to be stably held even when a predetermined external force is applied to the object; and
- a robot control signal generating unit that generates a signal for controlling the robot so that the robot holds the object in the determined holding form,
- wherein the holding form determining unit determines that the object can continue to be stably held even when the predetermined external force is applied to the object, when a force which should be generated by the at least one contact portion to generate resistance to the predetermined external force is included in a friction cone formed by a friction coefficient and a suction force from the suction mechanism.

6. A robot system comprising:
- a robot that has a suction mechanism for at least one contact portion coming in contact with an object to hold the object and that holds the object; and
- a control device that controls the robot,
- wherein the control device includes
  - a holding form determining unit that determines a holding form in which at least a position on the object coming in contact with the at least one contact portion is specified in advance as the holding form in which the object can continue to be stably held even when a predetermined external force is applied to the object, and
  - a robot control signal generating unit that generates a signal for controlling the robot so that the robot holds the object in the determined holding form, and
- the holding form determining unit determines that the object can continue to be stably held even when the predetermined external force is applied to the object, when a force which should be generated by the at least one contact portion to generate resistance to the predetermined external force is included in a friction cone of a force by driving the at least one contact portion and enlarged by a suction force from the suction mechanism.

* * * * *